Patented Sept. 15, 1953

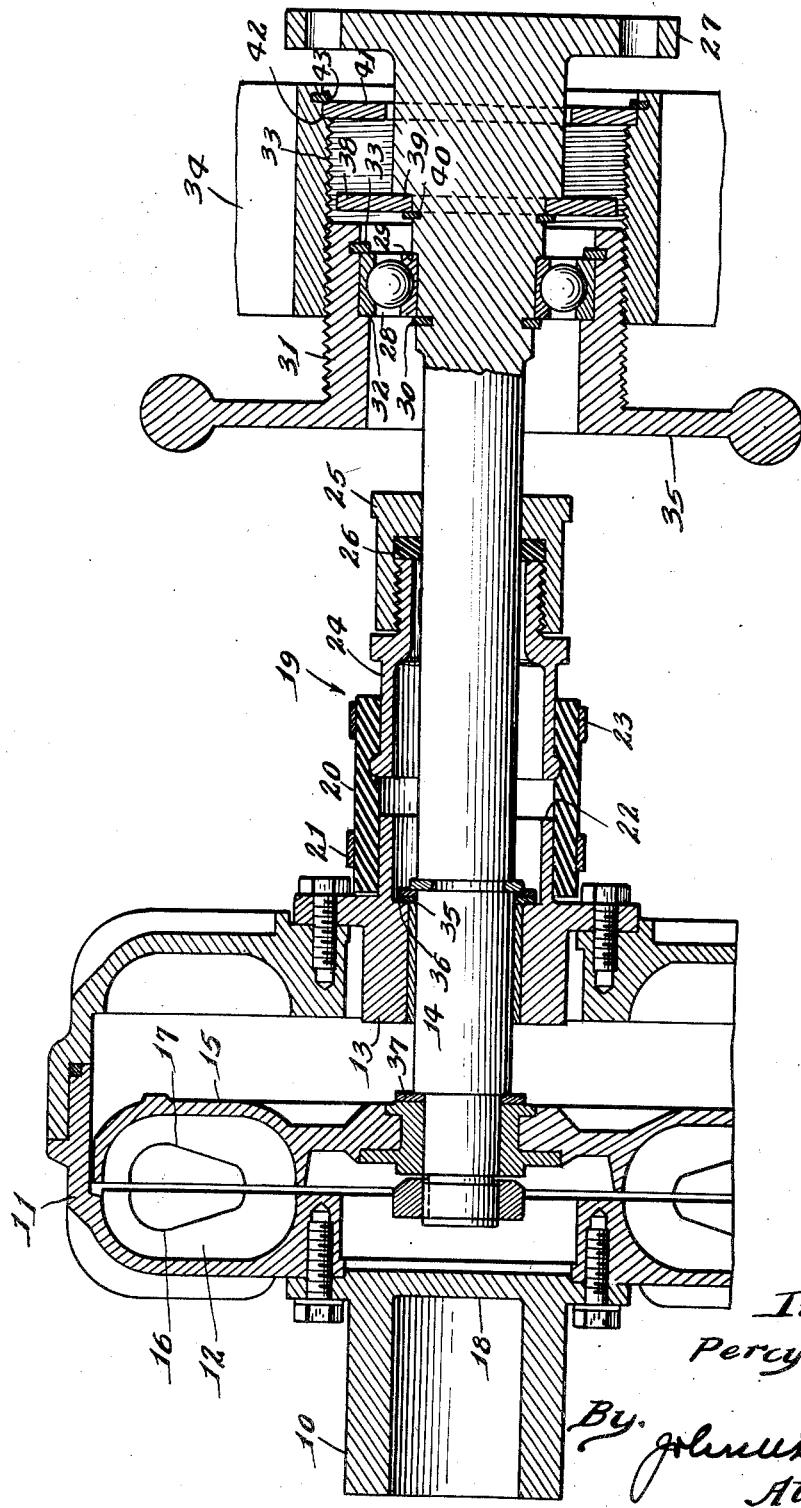

2,651,916

UNITED STATES PATENT OFFICE 2,651,916

ROTARY HYDRAULIC COUPLING AND MECHANICAL BRAKE MEANS

Percy H. Batten, Racine, Wis., assignor to Twin Disc Clutch Company, Racine, Wis., a corporation of Wisconsin Application June 12, 1948, Serial No. 32,647

2 Claims. (Cl. 60—54)

My invention relates to hydraulic couplings and more particularly to a device of this type in which provision is made for varying the working relation of the impeller and runner members and thus varying the relative slip thereof and the rotating speed of the output shaft.

In the usual hydraulic coupling, the fixed, axial relation of the impeller and runner limits operation of the coupling to the characteristic one in which the speed ratio of the impeller and runner is approximately 1:1, allowing for the runner slip which may be of the order of two to three per cent under full engine power. Such an arrangement makes no provision for varying the output shaft speed for any given input speed, although schemes for accomplishing this result have been proposed which vary the amount of working liquid in the coupling by means of pumps. This solution, however, is too cumbersome and costly for many installations.

It is therefore one object of the invention to provide a hydraulic coupling in which output shaft speed may be varied as desired by changing the axial gap or spacing of the impeller and runner and accordingly the slip rate of the latter member.

A further object is to devise a coupling of the character indicated in which the axial shifting of the runner to vary the gap is associated with means for positively braking the runner shaft in a position corresponding to a position of maximum gap or slip between the impeller and runner.

A further object is to provide a coupling in which the reactive thrust of the runner shaft is transmitted to a stationary frame and in which a simple seal construction is employed to seal the runner shaft against loss of the working liquid.

These and further objects of the invention will be set forth in the following specification, reference being had to the accompanying drawing, and the novel means by which said objects are effectuated will be definitely pointed out in the claims.

The drawing is a sectional elevation of the coupling and brake showing the coupling members in minimum gap position.

Referring to the drawing, the numeral 10 designates a hub whose opposite ends, respectively, are connected to a source of power (not shown) and an annular housing 11. One transverse wall of the housing is arranged as an impeller 12 and the other transverse wall is secured to a hub 13 substantially forming part of the housing and in which is journaled one end of a runner shaft 14. Rotatably secured to the shaft 14 is a runner 15 that is located in opposed and cooperating relation to the impeller 12 in the usual manner. It will be understood that the impeller 12 and runner 15 are provided with the customary radial blades 16 and 17, respectively, which cooperably define the liquid working circuits of the coupling.

The housing 11 forms a reservoir for the coupling and loss of liquid at the left end thereof is prevented by a barrier web 18 which may be integral with the hub 10 and at the right end by a seal structure identified generally by the numeral 19. Specifically, this seal comprises a hose 20 that may be composed of any of the synthetic rubbers that are resistant to the type of oil that is commonly used in couplings, one end of the hose encircling and being sealingly gripped by a clamp ring 21 to an annular extension 22 provided on the hub 13 in spaced and coaxial relation to the shaft 14. The other end of the hose 20 is similarly gripped by a ring 23 around one end of a nipple 24 whose opposite end is threaded to a gland nut 25. Packing 26 is interposed and clamped between the end of the threaded portion of the nipple 24 and the nut 25 and in encircling sealing relation to the shaft 14. By reason of its connection to the hub 13, the sealing structure 19 rotates with the impeller 12, but the shaft 14 may be moved axially relative to the structure for a purpose presently explained.

The right end of the runner shaft 14 may be flanged as at 27 for attachment to a load and adjacent thereto is journaled in a thrust bearing 28. The inner race of the bearing 28 is axially fixed relative to the shaft 14 through its opposite ends respectively abutting an annular shoulder 29 on the shaft and a split ring 30 recessed in the shaft. The outer race of the bearing 28 is carried within a sleeve 31 and is axially movable therewith by reason of its opposite ends respectively abutting an annular shoulder 32 within the sleeve and a split ring 33 recessed internally of the sleeve. The sleeve is coaxial with the shaft 14 and is externally threaded for engagement with an internally threaded portion 33 forming part of a fixed frame or housing 34. Rotation of the sleeve 31 is effected by means of a handwheel 35 connected therewith and since the sleeve is axially fixed relative to the shaft 14 through the bearing 28, it will be understood that a rotation of the handwheel 35 which moves the sleeve 31 towards the right will increase the gap between the impeller 12 and runner 15 by shifting the runner axially in the same direction and a contrary condition will obtain if the sleeve 31 is axially moved in the opposite direction, assuming that the runner had previously occupied a position to the right of that shown in the drawing.

In the position of parts as illustrated, the impeller 12 and runner 15 are spaced with a minimum gap as determined by the engagement of a thrust washer 35 carried by the shaft 14 abutting an internal shoulder 36 at the right end of the hub 13, while maximum gap between the impeller and runner is determined by a thrust washer 37, also carried by the shaft 14, abutting the left end of the hub 13. In other words, the washers 35 and 37 limit the fore and aft movements of the shaft 14.

In the operation of the coupling, assuming a condition of minimum gap which would correspond to the customary axial spacing of an impeller and runner in present types of couplings, for any given speed of the impeller 12, the speed of the runner 15 will depend upon the slip of the coupling and for a characteristic slip of two to three per cent, the speed of the runner would be very close to that of the impeller. As the gap is increased by moving the shaft 14 towards the right, it will be evident that the working circuits of the coupling are disturbed and the runner slip is increased so that for any given impeller speed, the speed of the runner further decreases relative thereto. On the other hand, if the runner 15 is initially moved from a position to the right of that shown in the drawing towards the minimum gap position, the runner slip will decrease and the speed of the shaft 14 will increase.

Therefore, this construction provides a simple arrangement for regulating the speed of the runner shaft 14 without affecting the speed of the impeller 12 and for transmitting torque at higher runner slips for any given speed of the impeller.

Means may be incorporated in the structure for positively braking the runner shaft in an axial position thereof corresponding to a maximum gap between the impeller and runner. For this purpose, an annular, friction plate 38 is fixed to the shaft 14 between a shoulder 39 around the shaft and a split ring 40 recessed in the shaft, and a similar plate 41 is fixedly mounted within the threaded portion 33 between a shoulder 42 and a split ring 43 recessed in the portion.

In the minimum gap position of the parts shown, the plates 38 and 41 are axially spaced at their maximum distance. As the gap is increased, the plate 38 is moved towards the plate 41 and just before these plates engage corresponds to a gap position that determines the lowest speed of the runner shaft. In this position, for example, and assuming an input speed of 500 R. P. M., the slip rate is approximately 30% greater than the slip at minimum gap with the same input R. P. M. Further axial movement of the shaft 14 towards the right engages the plates 38 and 41 and stops the shaft. Where the plates 38 and 41 are employed, their engagement not only stops the rotation of the shaft 14, but also limits the axial movement of the shaft in the indicated direction so that the thrust washer 37 may be eliminated.

Further features of the invention reside in the seal 19 which effectively prevents leaks arising from vibration and misalignment and the location of the thrust bearing outside the main coupling structure.

I claim:

1. In a hydraulic coupling, the combination of an impeller, a runner coaxial with and axially movable relative to the impeller to vary the space therebetween, a shaft connected to the runner, a stationary frame having a threaded opening through which the output end of the shaft extends in spaced, coaxial relation, a sleeve threaded in the opening, and a thrust bearing interposed between and axially fixed relative to the sleeve and shaft whereby movements of the sleeve into and out of the frame opening effect axial movements of the shaft and variations in the spacing between the impeller and runner.

2. In a hydraulic coupling, the combination of an annular housing having a pair of axially spaced, transverse walls, an impeller provided in one of the walls, a runner coaxial with and axially movable relative to the impeller to vary the space therebetween, a shaft connected to the runner and extending through the other wall, a stationary frame having a threaded opening through which the output end of the shaft extends in spaced, coaxial relation, a sleeve threaded in the opening, and a thrust bearing interposed between and axially fixed relative to the sleeve and shaft whereby movements of the sleeve into and out of the frame opening effect axial movements of the shaft and variations in the spacing between the impeller and runner.

PERCY H. BATTEN.

References Cited in the file of this patent

UNITED STATES PATENTS

| Number | Name | Date |
|---|---|---|
| 1,198,150 | Radcliffe | Sept. 12, 1916 |
| 1,911,670 | Black | May 30, 1933 |
| 2,050,550 | Yingling | Aug. 11, 1936 |
| 2,073,357 | Wemp | Mar. 9, 1937 |
| 2,082,581 | Kiep | June 1, 1937 |
| 2,318,187 | Addison | May 4, 1943 |
| 2,329,050 | Humphreys | Sept. 7, 1943 |
| 2,336,167 | Dillon | Dec. 7, 1943 |
| 2,471,212 | Hanson | May 24, 1949 |